J. C. REED,

Assignor to W. YAGLE & A. JOHNSTON.

Covering for Steam-Boilers.

No. 8,752. Reissued June 10, 1879.

Witnesses

R. J. McClure

W. A. Wood

Inventor

John C. Reed by James D. Gray

Attorney

N. PETERS, PHOTO-LITHOGRAPHER, WASHINGTON, D. C.

UNITED STATES PATENT OFFICE.

JOHN C. REED, OF MILLVALE, ASSIGNOR TO WILLIAM YAGLE AND ANDREW JOHNSTON, OF PITTSBURG, PENNSYLVANIA.

IMPROVEMENT IN COVERINGS FOR STEAM-BOILERS.

Specification forming part of Letters Patent No. 171,425, dated December 21, 1875; Reissue No. 8,752, dated June 10, 1879; application filed April 5, 1879.

*To all whom it may concern:*

Be it known that I, JOHN C. REED, of Millvale, in the county of Allegheny and State of Pennsylvania, have invented certain new and useful Improvements in Coverings for Steam Boilers and Pipes; and I do hereby declare that the following is a full, clear, and exact description of the invention, that will enable others skilled in the art to which it appertains to make and use the same, reference being had to the accompanying drawings, and to the letters of reference marked thereon, which form a part of this specification, in which—

Figure 1:
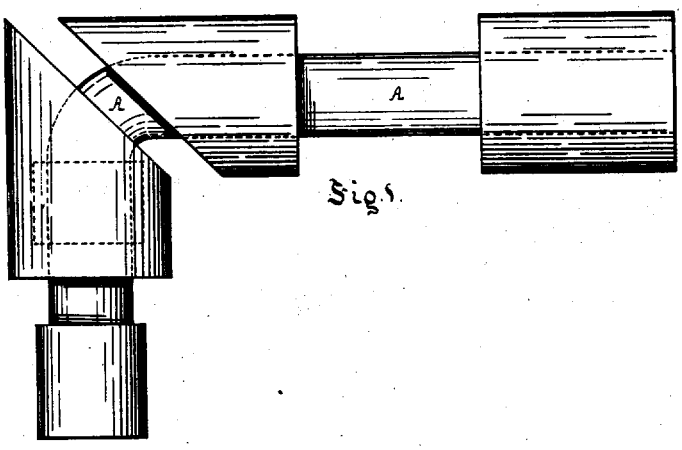
Figure 2:
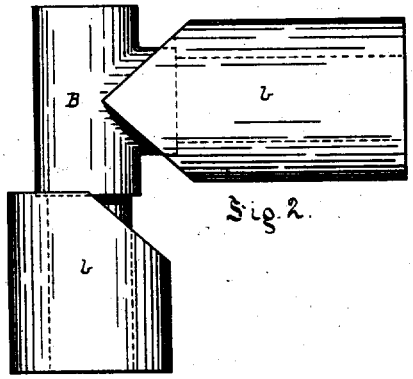
Figure 3:
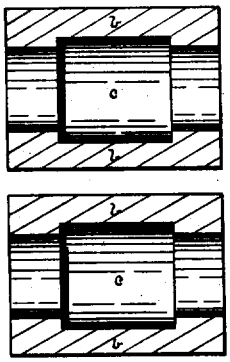

Figure 1 is a view of a piece of pipe with my non-conducting covering applied thereto. Fig. 2 is a view of a T-joint and pipe with the covering partly removed, and Fig. 3 is a view of the non-conducting covering detached.

Like letters refer to like parts wherever they occur.

My invention relates to that class of articles known as "boiler-coverings," or non-conducting coverings for boilers, steam, water, and other pipes.

Heretofore these coverings have principally been made of different compositions, which were applied to the boilers or pipes in a plastic state, and dried by the heat of the boilers or pipes or by the action of the atmosphere. They have also been made in the shape of shells or tiles composed of clay and like substances baked to the desired shape, so as to fit over or around the boilers or pipes. In some cases, also, a sheathing formed of tar-paper and asbestus or like substance has been used for this purpose. The different composition coverings, whether applied in a plastic state or in tiles, have, however, been found objectionable because of their liability to crack or break on account of the heat, or on sudden jars to the pipe, or during transportation. The sheathing was also hard to apply, and did not give sufficient protection. By my invention these objections are entirely overcome, its object being to form an efficient boiler-covering, ready, when finished, to be placed upon the surface to be covered, and tough and strong, so that it is not liable to crack or break during transportation or by the heat.

It consists in a non-conducting covering, composed of layers or wrappings of paper saturated or coated with suitable adhesive material, and compressed while being formed into tubular sections; and, second, in forming this non-conducting covering into tubular sections divided longitudinally, so as to be placed around the pipes or other surfaces to be covered.

I will now proceed to describe my invention, so that others skilled in the art may apply the same.

I prepare the non-conducting covering from paper, for which purpose I prefer and generally employ what is termed "roofing-paper," though other kinds of paper may be used. Upon a revolving mandrel of suitable size, regulated for the purpose for which the covering is intended, and generally a section of pipe of the same diameter as the pipe to which the covering is to be applied, I wind or wrap the roofing or other paper, at the same time applying some adhesive mixture to the layers to cause adhesion, and making traction on the free end of the paper, so as to lay the wrappings firmly and smoothly. In addition to the traction, which will compact the covering, I make use of pressure by means of weighted friction bar or plate, or in other suitable manner, so as to insure a dense, firm structure throughout.

This operation is continued until a covering of sufficient thickness has been applied to the pipe, when, if the covering has been formed on the pipe (taking the place of a mandrel) upon which it is to remain, the covering may be finished by applying a suitable coat of paint, which can be readily and rapidly done by revolving the pipe before its removal; but if the covering has been formed on a mandrel or pipe with which it is not intended to use it, it may be coated with paint at the time and then withdrawn from the mandrel, to be afterward slipped upon the tubing upon which it is to remain, or it can be cut longitudinally into sections, and applied as illustrated in the drawings, and coated with paint afterward.

In the drawings, A indicates a pipe covered with the non-conducting covering of paper, applied directly or formed on the pipe, or which may be formed as a sleeve upon a separate mandrel and then slipped upon the pipe.

B indicates a T-joint, the covering *b* of which has been previously formed upon a separate mandrel, and cut in sections for convenience in transportation and application to the tubing. The sections *b b* are divided longitudinally into two parts or halves, as shown in Fig. 3, so that they may be fitted around the tubing or other surface, instead of slipping them on from the end. The sections, after being placed in position upon the tubing, may be secured by wires or in other suitable way.

In covering a pipe, where the non-conductor is applied directly to and remains upon the tubing, a free space is left near the threaded ends sufficiently large to give purchase for the pipe-tongs, in order that sections of tubing may be readily coupled and uncoupled. This free space, together with the socket, may be covered by applying and securing in place a short section of covering, the socket fitting into a suitable recess or recesses, *c c*, formed for its reception therein.

Instead of using adhesive or mucilaginous substances to bind the layers together, wires, wire mesh, and like filaments may be employed, being wound in with the layers at the time of forming the covering; but they can be used to advantage only where the covering is to remain upon the pipe upon which it is formed, or where it is to be slipped upon another piece of tubing. Where the covering-cylinder is to be cut longitudinally, adhesive material must be employed as a binder.

Where very high heats are to be guarded, a wash or paste or layer of fire-clay or other suitable material may be applied next to the pipe, and within the inner folds or wrappings of the covering.

The advantages of my improved covering are, that it is tough and strong, being formed of a fibrous material compressed so as to form a dense, firm structure throughout. For this reason it can be made at one place and transported to the place where it is to be applied, or can be removed and replaced at will for the examination and repair of the tubing without danger of breakage by falling or any ordinary blows. The compression also makes the covering air-tight, so that the air cannot pass through to the surface of the tubing and burn out the covering. It is, in fact, an article of manufacture, a covering which can be sold as such in the market, one which is neat in appearance, and will not soil or damage the finest machinery or tubing to which it may be applied. It is a thorough non-conductor, a covering of one and a half inch thick giving better results than a three-inch thickness of any other non-conducting covering known to me; and, finally, it can be produced at one-half the cost of the usual fire-clay, lime, asbestus, and similar coverings. I have tested it on steam-tubing at eighty to one hundred pounds pressure, giving a heat of 300° Fahrenheit, or more, and after a thorough trial have found the covering unaffected by the heat and effective as a non-conductor.

I am aware that pipes for conducting water, &c., have been formed of layers of paper bound together with bituminous or caoutchouc substances to make them water-tight, and hence do not claim this as my invention; but

What I claim as my invention, and desire to secure by Letters Patent, is—

1. A non-conducting covering for boilers, pipes, and other surfaces, composed of layers or wrappings of paper saturated or coated with suitable adhesive material, and compressed while being formed into tubular sections, substantially as described.

2. As a new article of manufacture, a non-conducting covering for boilers, pipes, and other surfaces, composed of layers or wrappings of paper saturated or coated with suitable adhesive material, and compressed while being formed into tubular sections divided longitudinally, so as to be placed around the pipes or other surfaces to be covered, substantially as set forth.

In testimony that I claim the foregoing I have hereunto set my hand this 2d day of April, 1879.

JOHN C. REED.

Witnesses:
C. O'DONNELL,
WILLIAM YAGLE.